United States Patent [19]
Zugel

[11] 3,917,424
[45] Nov. 4, 1975

[54] CLAMPING DEVICE FOR COUPLINGS

[75] Inventor: Martin J. Zugel, Cleveland, Ohio

[73] Assignee: Cyclo Index Corporation, Cleveland, Ohio

[22] Filed: Apr. 10, 1974

[21] Appl. No.: 459,471

Related U.S. Application Data

[62] Division of Ser. No. 379,384, July 16, 1973, Pat. No. 3,844,137.

[52] U.S. Cl. ............... 403/287; 403/344; 403/302; 403/313
[51] Int. Cl.² .......................................... F16D 1/06
[58] Field of Search .......... 403/344, 302, 305, 312, 403/287, 313, 354, 375, 373, 309

[56] References Cited
UNITED STATES PATENTS

| 147,837 | 2/1874 | Heginbothom | 403/312 |
| 764,399 | 7/1904 | Villiger, Jr. | 403/344 X |

FOREIGN PATENTS OR APPLICATIONS

| 227,723 | 4/1960 | Australia | 403/312 |
| 1,234,563 | 6/1971 | United Kingdom | 403/344 |

OTHER PUBLICATIONS

German printed application 9/1959, Deutsche Electronic 403/313, No. 1,066,060.

Primary Examiner—Andrew V. Kundrat
Attorney, Agent, or Firm—Donnelly, Maky, Renner & Otto

[57] ABSTRACT

A clamping device for clamping at least one end of a coupling to a shaft includes a pair of opposite clamping members having cooperating arcuate facing inner surfaces for clamping onto a shaft. Means are provided for securing the clamping members to one end of the coupling against axial and rotational movement relative thereto, while providing clamping and unclamping movement of such clamping members toward and away from one another.

10 Claims, 7 Drawing Figures

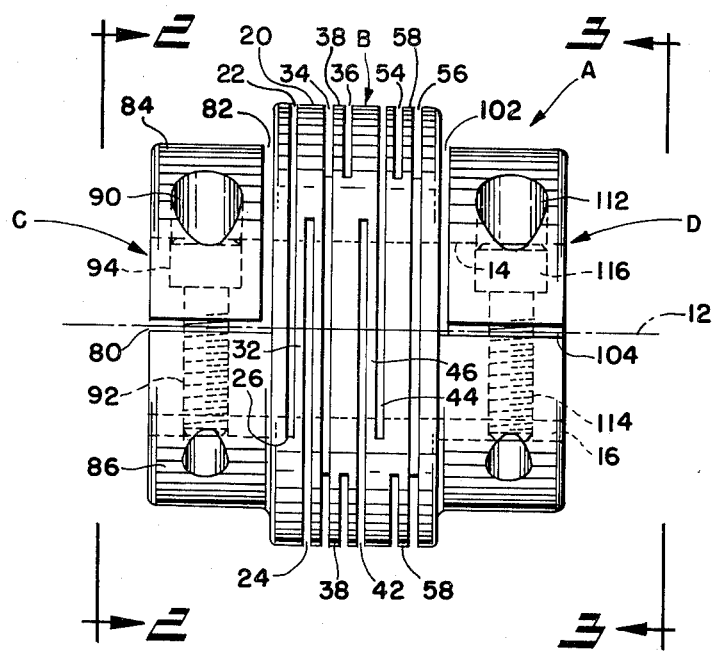
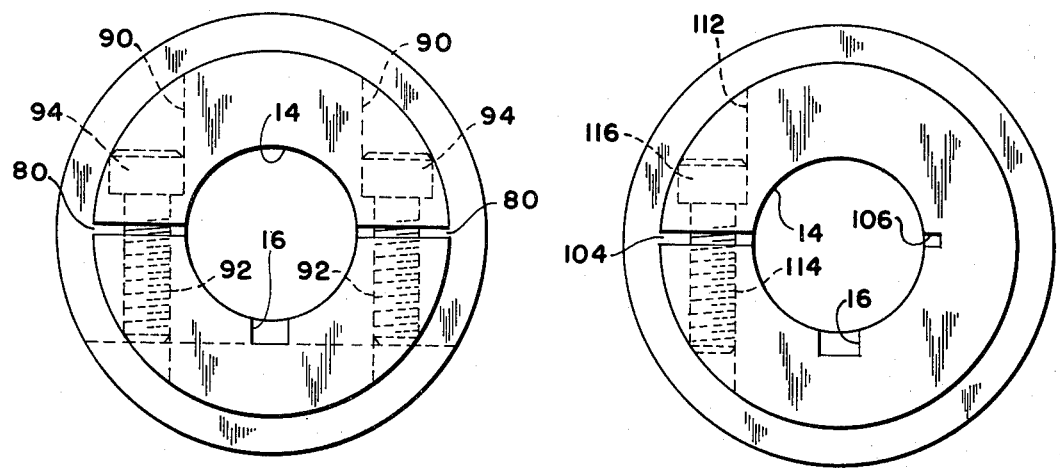
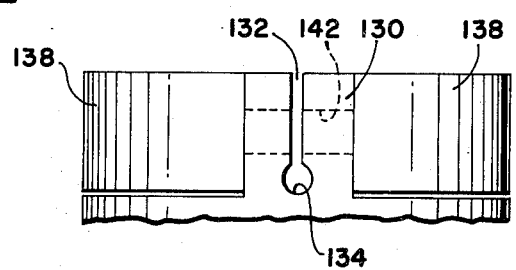

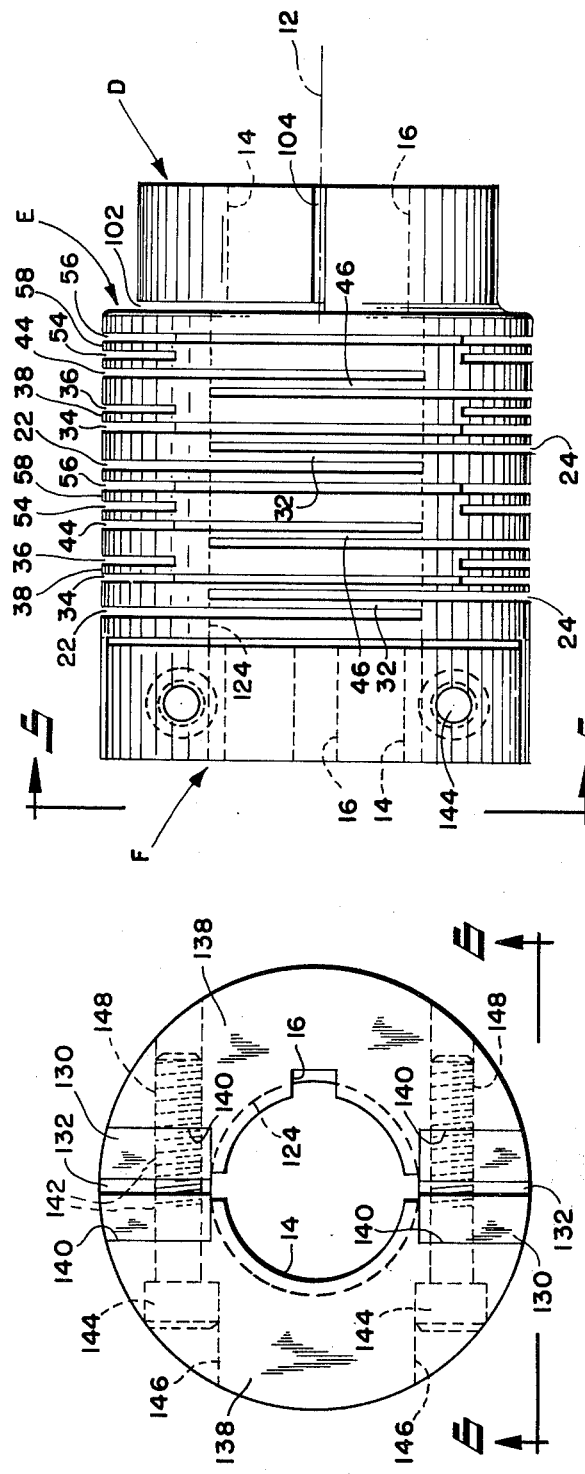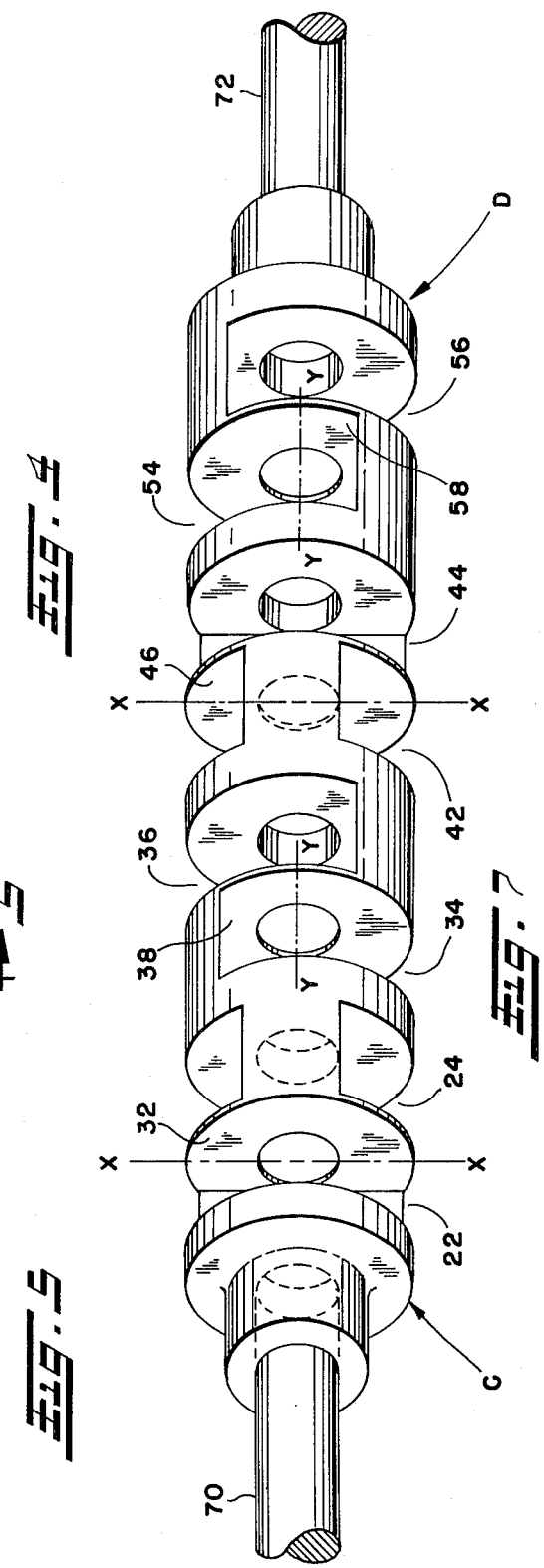

CLAMPING DEVICE FOR COUPLINGS

BACKGROUND OF THE INVENTION

This application is a division of copending U.S. Pat. application Ser. No. 379,384, filed July 16, 1973 and now U.S. Pat. No. 3,844,137.

This invention pertains to the art of claimping devices, and more particularly to clamping devices for clamping couplings to shafts.

Couplings are commonly attached to axially aligned shafts by providing integral inwardly facing surfaces on the ends of such couplings for cooperating with facing arcuate surfaces on separate clamping members secured to such coupling. In such arrangements having one arcuate clamping surface integral with the coupling itself, misalignment of the two shafts in certain directions makes it impossible to clamp onto the shafts along the true orbiting center of the coupling.

SUMMARY OF THE INVENTION

In accordance with the present invention, a clamping device for clamping at least one end of a coupling to a shaft includes a pair of opposite clamping members having cooperating arcuate inner facing surfaces for clamping onto a shaft. The pair of clamping members are separate from one another and from the coupling. Means are provided for securing the clamping members to one end of the coupling against axial and rotational movement relative thereto, while providing for clamping and unclamping movement of such clamping members toward and away from one another.

In one arrangement, at least one of the clamping members includes locking means for locking such member against rotational movement relative to the shaft, and such locking means may comprise a longitudinally extending keyway in the inner surface of such one clamping member.

At least one end of the coupling member has opposite projections extending longitudinally outwardly therefrom and the clamping members are positioned with their ends on opposite sides of the projections. The projections and the ends of the clamping members have aligned bolt receiving holes therethrough, and the projections are longitudinally slit substantially perpendicular to the axes of the bolt receiving holes. The holes in one clamping member are threaded and threadably receive bolts which extend freely through the holes in the projections and the other clamping member so that tightening of such bolts draws the ends of the clamping members toward one another and reduces the width of the projection slits. Enabling movement of the clamping members relative to one another and to the coupling makes it possible to clamp onto a shaft along the true orbiting center of the coupling.

In a preferred arrangement, the ends of the clamping members have recesses receiving the projections so that the arcuate inner surfaces of the clamping members extend toward one another past the longitudinal outer surfaces of the projections and generally radially inwardly of such projections. The coupling has a central hole therethrough and the facing inner surfaces of the clamping members lie generally on the periphery of the circle having a diameter substantially less than the diameter of such central hole.

With the foregoing in mind, it is a principal object of the present invention to provide an improved clamping device for clamping couplings to shafts.

Another object is to provide a clamping device which enables clamping of couplings to shafts along the true orbiting center of such couplings.

A further object is to provide such a clamping device which is very economical to manufacture and highly reliable in operation.

Other objects and advantages of the present invention will become apparent as the description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but several of the various ways in which the principles of the invention may be employed.

BRIEF DESCRIPTION OF THE DRAWINGS

In the annexed drawings:

FIG. 1 is a side elevational view of a coupling member;

FIG. 2 is an end elevational view looking generally in the direction of arrows 2—2 of FIG. 1;

FIG. 3 is an end elevational view looking generally in the direction of arrows 3—3 of FIG. 1;

FIG. 4 is a side elevational view of a coupling having the improved clamping device of the present invention incorporated therein;

FIG. 5 is an end elevational view looking generally in the direction of arrows 5—5 of FIG. 4;

FIG. 6 is a bottom plan view looking generally in the direction of arrows 6—6 of FIG. 5; and FIG. 7 is a schematic perspective illustration showing the action of the coupling of FIGS. 1 and 4.

DESCRIPTION OF THE PREFERRED EMBODIMENT

Referring now to the drawings, wherein the showings are for purposes of illustrating a preferred embodiment of the invention only and not for purposes of limiting same, FIG. 1 shows a flexible coupling member A which is formed of substantially rigid material such as steel or aluminum. However, it will be appreciated that such coupling member may also be formed from substantially rigid synthetic plastic material or reinforced plastic material. Coupling member A includes a substantially cylindrical body portion B having a central longitudinal axis 12, a longitudinal cylindrical bore 14, and opposite end portions C and D. Bore 14 may have a longitudinal keyway 16 formed therein for receiving a key on end portions of shafts adapted to be secured to such end portions C and D.

Body portion B has a cylindrical peripheral wall 20 defined between its outer peripheral surface and the peripheral surface of bore 14 in which a plurality of longitudinally-spaced overlapping slots are formed. In one arrangement, a first pair of longitudinally-spaced overlapping slots are defined by first slot 22 positioned closest to end portion C, and second opposed slot 24 positioned further from end portion C. Slots 22 and 24 are angularly displaced substantially 180° relative to one another, and extend into peripheral wall 20 of body portion B completely across bore 14 and slightly into peripheral wall 20 at bottom slot ends 26 and 28. This first pair of slots 22 and 24 define leaf springs 32 therebetween formed by very thin longitudinal sections of peripheral wall 20 on opposite sides of bore 14.

A second pair of longitudinally-spaced overlapping slots 34 and 36 are formed in body member B, angularly spaced substantially 180° relative to one another, and angularly displaced substantially 90° relative to slots 22 and 24. Slots 34 and 36 define leaf springs 38 therebetween extending substantially perpendicular to first leaf springs 32 formed between slots 22 and 24.

A third pair of longitudinally spaced slots 42 and 44 are formed in body member B, angularly spaced 180° relative to one another, and angularly aligned relative to slots 22 and 24. However, first slot 42 of this third pair of slots 42 and 44 is positioned closest to end portion C, and is angularly aligned with second slot 24 of first pair of slots 22 and 24. In other words, third pair of slots 42 and 44 are angularly aligned with first pair of slots 22 and 24 but are reversely positioned relative to the first pair of slots, and define leaf springs 46 therebetween in angular alignment with leaf springs 32.

A fourth pair of longitudinally-spaced overlapping slots 54 and 56 are formed in body portion B, angularly displaced relative to one another 180° and displaced substantially 90° with respect to third pair of slots 42 and 44. Fourth pair of slots 54 and 56 are also angularly aligned with second pair of slots 34 and 36, but first slot 54 of fourth pair of slots 54 and 56 positioned closest to end portion C is angularly aligned with second slot 36 of second pair of slots 34 and 36. In other words, fourth pair of slots 54 and 56 are simply reversed relative to second pair of slots 34 and 36. Fourth pair of slots 54 and 56 also define leaf springs 58 therebetween extending substantially parallel to leaf springs 38, and substantially perpendicular to leaf springs 32 and 46.

FIG. 7 schematically shows the spring action provided by making the slots in the above-described manner. The described slots form four longitudinally spaced leaf springs 32, 38, 46 and 58. Leaf springs 32 and 46 are substantially in alignment with one another and bend about axes parallel to lines X—X. Leaf springs 38 and 58 are in substantial alignment with one another but extend substantially perpendicular to springs 32 and 46 so that bending occurs about axes extending substantially parallel to lines Y—Y. With such an arrangement, bending action is enhanced for accommodating axial and radial misalignment.

The described non-repetitive arrangement of making the slots also connects the opposite end portions of body portion B to alternate opposite ends of the leaf springs. For example, it will be recognized that each described leaf spring has opposite end portions. In the showing of FIG. 7, springs 32 and 46 may be considered as having right and left end portions, with the right end portions appearing closest to end portion D and the left end portions appearing closest to end portion C, while springs 38 and 58 may be considered to have top and bottom portions. As shown in FIG. 7, end portion C is effectively connected with one or a left end portion of leaf spring 32. However, the described non-repetitive arrangement of making the slots effectively connects ebd portions with the opposite or right end portion of leaf spring 46. Likewise, end portion C is effectively connected with one end portion of leaf spring 38, while being effectively connected with the opposite end portion of leaf spring 58. The same is true for end portion D. As shown in FIG. 7, opposite end portion D is effectively connected with the top end portion of leaf spring 58, while being effectively connected with the bottom or opposite end portion of leaf spring 38. End portion D is also effectively connected with one or the left end portion of leaf spring 46, while being effectively connected with the right or opposite end portion of leaf spring 32. It has been found that this arrangement for connecting the opposite end portions of body portion B to opposide end portions of corresponding leaf springs enhances the bending action for effectively accommodating axial and radial misalignment, while maintaining an ability to transfer high torque loads.

Obviously, opposed shafts 70 and 72 are adapted to be connected with opposite end portions C and D. The longitudinal axes of shafts 70 and 72 may intersect one another at an angle instead of lying in a perfectly straight line, and such longitudinal axes may also be radially misaligned relative to one another. The described flexible coupling arrangement effectively accommodates such axial and radial misalignment, while maintaining the ability to transfer high torque loads, and relieving high stresses from bearings supporting shafts 70 and 72.

With the arrangement described with respect to FIG. 1, it should be recognized that the four springs, and the slots defining such springs, form a non-repetitive set of slots and springs. More than one such set of slots and spring may be formed in a body portion of a flexible coupling member if so desired. An arrangement having two such sets of slots and springs is shown in FIGS. 4 through 6.

Obviously, many different arrangements may be provided for securing the opposite end portions of shafts 70 and 72 to end portions C and D. In the arrangement of FIG. 2, end portion C is longitudinally split at 80 on opposite sides of bore 14 to intersect a slot 82. This provides a somewhat inverted U-shaped portion 84 which is separable from body portion B, and an opposite generally U-shaped portion 86 integral with body portion B. Portion 84 may then be tapped as at 90, while portion 86 has threaded bores 92 therein. Bolts 94 may extend through holes 90 into threaded bores 92 for clamping portion 84 against portion 86 to secure an end portion of a shaft therebetween.

In accordance with another arrangement, a slot 102 may be formed between body portion B in opposite end portion D. A single longitudinally extending slot 104 may then be formed in end portion D on one side of bore 14 to intersect slot 102. A notch 106 may be formed in bore 14 opposite longitudinal slot 104. End portion D will then be operative somewhat in the manner of a C-ring for radial expansion and contraction by opening or closing longitudinal slot 104. An aligned hole 112 and threaded bore 114 on opposite sides of longitudinal slot 104 are adapted to receive a bolt 116 for closing longitudinal slot 104 and clamping an end portion of a shaft within bore 14 in end portion D.

In the arrangement of FIG. 4, substantially rigid cylindrical body portion E may have a somewhat enlarged bore 124 formed therethrough intersecting smaller shaft securing bore 14 in end portion D which has the same construction as described with respect to FIG. 3. Opposite end portion F of body portion E may have opposite longitudinally extending projections 130 thereon. Projections 130 are longitudinally slit as at 132 to intersect an enlarged hole 124 which simply allows projections 130 to flex by closing of slots 132. A pair of opposed arcuate members 138 have recesses 140 receiving projections 130. The interior surfaces of arcuate members 138 are formed to define bore 14.

Projections 130 have holes 142 therethrough for receiving bolts 144 which extend through holes 146 in one of arcuate members 138 into threaded holes 148 in the other of arcuate members 138. Tightening of bolts 144 will move arcuate members 138 toward one another and close slots 132 in projections 130 for securely clamping an end portion of a shaft in bore 14. Obviously, many different arrangements involving set screws and the like may be provided for securing shafts to the opposite ends of the flexible coupling member.

In the arrangements described, all of the slots forming the leaf springs preferably extend substantially parallel to one another and substantially perpendicular to longitudinal axis 12 of the flexible coupling member. The width of the leaf springs parallel to longitudinal axis 12 may vary depending upon the strength of the metal used for making the coupling, and upon the size of the coupling itself. Obviously, for a very small coupling connecting two relatively small shafts transmitting low torque, the springs would be relatively thin. For an extremely large coupling for transmitting high torque between two relatively large shafts, the width of the springs would be proportionately larger.

End portion F of FIGS. 4-6 may be provided at both ends of a coupling member and has the advantage of enabling connection to various shaft sizes simply by providing arcuate members 138 with interior surfaces having various radii to define various diameter bores 14.

In the arrangement shown and described, each leaf spring is effectively cantilevered from one end connected to a shaft. For example, with reference to FIG. 7, spring 32 is cantilevered from one end effectively connected with shaft 70, and is cantilevered from its opposite end effectively connected with shaft 72.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A clamping device for clamping at least one end of a coupling to a shaft comprising; a pair of opposite clamping members having cooperating arcuate facing inner surfaces, securing means for securing said clamping members to said one end of said coupling against axial and rotational movement relative thereto, and clamping means for drawing said clamping members toward one another to clamp said inner surfaces thereof to a shaft, said one end of said coupling including opposite projections extending longitudinally outwardly therefrom, said clamping members being positioned with their ends on opposite sides of said projections.

2. The device of claim 1 wherein said projections are longitudinally slit parallel to said ends of said clamping members for providing flexing of said projections by closing of said slots when said clamping means is tightened.

3. The device of claim 1 wherein said ends of said clamping members have recesses receiving said projections so that said arcuate inner surfaces of said clamping members extend toward one another past the longitudinal outer surfaces of said projections and generally radially inwardly of said projections.

4. The device of claim 2 wherein said coupling has a central hole therethrough and said facing inner surfaces of said clamping members lie generally on the periphery of a circle having a diameter substantially less than the diameter of said central hole, said slits in said projections intersecting said central hole in said coupling.

5. The device of claim 1 wherein at least one of said clamping members include locking means for locking such member against rotational movement relative to the shaft.

6. The device of claim 1 wherein said clamping means comprises aligned holes in said projections and the ends of said clamping members, and bolts received in said holes.

7. The device of claim 6 wherein said holes in one of said clamping members are threaded holes, and said bolts extend through said holes in said projections and the other of said clamping members and are threaded into said threaded holes.

8. A clamping device for clamping at least one end of a coupling to a shaft comprising; a pair of opposite clamping members having cooperating arcuate inner facing surfaces for clamping onto a shaft, and means for securing said clamping members to said one end of said coupling against axial and rotational movement relative thereto while providing clamping and unclamping movement of said clamping members toward and away from one another including opposite projections extending longitudinally outwardly from said one end, said clamping members having ends positioned on opposite sides of said projections, and aligned bolt receiving holes in said ends and projections.

9. The device of claim 8 wherein said projections are longitudinally split substantially perpendicular to the longitudinal axes of said bolt receiving holes, said holes in one of said clamping members being threaded and threadably receive bolts which extend freely through said holes in said projections and in the other of said clamping members, whereby tightening of said bolts draw the opposed ends of said clamping members toward one another and reduces the width of said slits in said projections.

10. The device of claim 9 wherein said ends of said clamping members have recesses receiving said projections so that said arcuate inner surfaces extend toward one another past the longitudinal outer surfaces of said projections generally radially inwardly of said projections, said coupling having a central hole therethrough, and said arcuate inner surfaces lie generally on the periphery of a circle having a diameter less than the diameter of said central hole.

* * * * *